United States Patent
Callen et al.

(10) Patent No.: US 6,332,125 B1
(45) Date of Patent: Dec. 18, 2001

(54) PROVIDING TERMINATION BENEFITS FOR EMPLOYEES

(75) Inventors: Brock W. Callen; Hope C. Callen, both of Chilmark, MA (US)

(73) Assignee: Spincor LLC, Chilmark, MA (US)

( * ) Notice: Subject to any disclaimer, the term of this patent is extended or adjusted under 35 U.S.C. 154(b) by 0 days.

(21) Appl. No.: 09/215,950

(22) Filed: Dec. 18, 1998

(51) Int. Cl.⁷ .................................................. G06F 17/60
(52) U.S. Cl. ................................................. 705/4; 705/400
(58) Field of Search ............................... 705/4, 1, 10, 400

(56) References Cited

U.S. PATENT DOCUMENTS

| | | | | |
|---|---|---|---|---|
| 4,766,539 | * | 8/1988 | Fox .......................................... | 705/4 |
| 5,712,984 | * | 1/1998 | Hammond et al. ....................... | 705/4 |
| 5,806,042 | * | 9/1998 | Kelly et al. ............................... | 705/4 |
| 5,832,497 | * | 11/1998 | Taylor .................................. | 707/104 |
| 5,913,198 | * | 6/1999 | Banks ....................................... | 705/4 |
| 5,970,464 | * | 10/1999 | Apte et al. ............................... | 705/4 |
| 6,014,632 | * | 1/2000 | Gamble et al. ........................... | 705/4 |
| 6,026,364 | * | 2/2000 | Whitworth ............................... | 705/4 |
| 6,092,047 | * | 7/2000 | Hyman et al. ............................ | 705/4 |
| 6,182,048 | * | 1/2001 | Osborn et al. ........................... | 705/4 |

FOREIGN PATENT DOCUMENTS

WO-92/14212 * 8/1992 (WO) .

OTHER PUBLICATIONS

Lee, Chris, "Outplacement: Throwing Them Life Preservers", Training: The Magazine of Human Resources Development, vol. 24, No. 7, Abstract, Jul. 1987.*

Anonymous, "1991 Survey of Severance Pay Policies and Practices", Executive Briefing, Dec. 1991.*

Abraham et al, "Job Security in America: A Better Approach", Brookings Review, vol. 11, No. 3, Summer 1993.*

Kurland, Orin M., "Looking at EPLI Underwriting Requirements", Risk Management, vol. 41, No. 2, Feb. 1994.*

Caudron, Shari, "What is Employment Practices Liability?", Personnel Journal, vol. 75, No. 12, Dec. 1996.*

Levin–Waldmen, Oren, "Unemployment Insurance for a New Age", Challenge, vol. 40, No. 2, Mar./Apr. 1997.*

* cited by examiner

Primary Examiner—James P. Trammell
Assistant Examiner—John W. Hayes
(74) Attorney, Agent, or Firm—Fish & Richardson P.C.

(57) ABSTRACT

A computer-based method for pricing and managing an insurance product under which an insurer will provide termination benefits to employees who are non-voluntarily terminated from employment by an employer. The product reduces adverse selection risks and durational risks associated with periods of unemployment.

64 Claims, 28 Drawing Sheets

Insurance Company
Street Address
City, State

Name of Insured Corporation
Street Address
City, State                                              Policy Number: 111111-11

Policy Term: from_____to_____

Scope of the Insurance

In consideration of the payment of premium and subject to all of the terms, conditions, provisions, limitations and exclusions of the policy, Glencoe Insurance Ltd (the "Company") hereby agrees with the [*Name of the Insured Corporation*] (the "Insured") to cause to be paid on behalf of the Insured certain benefits ("Termination Benefits") to certain described persons ("Eligible Persons").

Policy Term and Renewal

The policy term stated above begins and ends at 12:01 A.M. AST at the Insured's address as shown above. Subject to the consent of the Company and the Company's right to change premium rates at any anniversary date of the policy by giving to the Insured at least thirty-one days written notice prior to such anniversary date, this policy may be renewed by the Insured on any anniversary date for a consecutive [*5 Year*] term by the payment of the required premium.

Forms attached to and forming a part of this policy on its date of issue are:

FORM NUMBER                            DESCRIPTION

In witness whereof, the Company issuing this policy has caused this policy to be signed by its authorized officer, but this policy shall not be valid unless also signed by a duly authorized representative of the Company.

Insurance Company

_____, its President          _____, its Secretary

Countersigned_____

FIGURE 8A

SPIN INSURANCE COVERAGE FORM

PLEASE READ THE ENTIRE FORM CAREFULLY

Various provisions in this policy restrict coverage. Read the entire policy carefully to determine rights, duties and what is and is not covered.

Throughout this policy the words "you" and "your" refer to the Named Insured shown in the Declarations, and any other person or organization qualifying as a Named Insured under this policy. The words "we", "us" and "our" refer to the Company providing this insurance.

The word "insured" means any person or organization qualifying as such under WHO IS INSURED (Section IV).

Other words and phrases that appear in quotation marks have special meaning. Refer to DEFINITIONS (Section VI).

SECTION I - COVERAGES

TERMINATION BENEFITS COVERAGE
1. Insuring Agreement.
  a. The Insured is the entity or each of the entities named as Insured in the Declarations and shall not include any division, subsidiary or affiliate ("Affiliate") unless such division, subsidiary or Affiliate is named in the Declarations as an Insured.
  b. We will pay on behalf of the Insured, periodically, but no less frequently than once each month, Termination Benefits to Eligible Persons whose employment has been terminated for a ("Non-Causal Reason").
  c. Such Termination Benefits shall not exceed the number of weeks of the Eligible Person's average gross salary earned from the Insured for the two years immediately preceding termination as set forth in the Schedule of Eligible Persons, reduced by the amount of any available State Government and/or Federal Government unemployment benefit to which the Eligible Person is entitled and further reduced by the product of that amount of the Termination Benefits that are not includable in the gross income of the Eligible Person and the marginal rate of the Eligible Person.
    1. As used herein, the word ("Terminate") shall mean the ending of employment and not any temporary interruption of employment.
    2. In no event shall such periodic payments continue once the Eligible Person has secured employment, and government-provided unemployment insurance has ceased or would cease.
    3. In no event will the sum paid to an "Eligible Person" exceed the ("Maximum

FIGURE 8B

Individual Benefit") as listed in the Schedule of Eligible Persons.

SCHEDULE OF ELIGIBLE PERSONS

TABLE 1

| CLASS | JOB CLASSIFICATION |
|---|---|
| A | Manufacturing |
| B | Clerical/Secretarial |
| C | Administrative |
| D | Management Information Systems |
| E | Sales |
| F | Executive |

TABLE 2

| CLASS | SALARY CLASSIFICATION |
|---|---|
| A | < $ 25,000 |
|   | > $ 25,000, but < $ 35,000 |
|   | > $ 35,000, but < $ 50,000 |
|   | > $ 50,000, but < $ 80,000 |
|   | > $ 80,000, but < $100,000 |
|   | > $100,000 |

| CLASS | SALARY CLASSIFICATION |
|---|---|
| B | < $ 35,000 |
|   | > $ 35,000, but < $ 50,000 |
|   | > $ 50,000, but < $ 80,000 |
|   | > $ 80,000, but < $ 100,000 |
|   | > $ 100,000, but < $125,000 |
|   | > $ 125,000 |

FIGURE 8C

| CLASS | SALARY CLASSIFICATION |
|---|---|
| C | < $ 35,000 |
| | > $ 35,000, but < $ 50,000 |
| | > $ 50,000, but < $ 80,000 |
| | > $ 80,000, but < $ 100,000 |
| | > $ 100,000, but < $125,000 |
| | > $ 125,000 |

| CLASS | SALARY CLASSIFICATION |
|---|---|
| D | < $ 45,000 |
| | > $ 45,000, but < $ 60,000 |
| | > $ 60,000, but < $ 85,000 |
| | > $ 85,000, but < $110,000 |
| | > $ 110,000, but < $140,000 |
| | > $ 140,000 |

| CLASS | SALARY CLASSIFICATION |
|---|---|
| E | < $ 50,000 |
| | > $ 50,000, but < $ 75,000 |
| | > $ 75,000, but < $ 100,000 |
| | > $ 100,000, but < $ 125,000 |
| | > $ 125,000, but < $150,000 |
| | > $ 150,000 |

| CLASS | SALARY CLASSIFICATION |
|---|---|
| F | < $ 60,000 |
| | > $ 60,000, but < $ 85,000 |
| | > $ 85,000, but < $ 120,000 |
| | > $ 120,000, but < $ 140,000 |
| | > $ 140,000, but < $175,000 |
| | > $ 175,000 |

FIGURE 8D

TABLE 3

| TENURE | CLASS A MAXIMUM INDIVIDUAL BENEFIT |
|---|---|
| 3 - 5 Years | [   ] Weeks |
| 6 - 10 Years | [   ] Weeks |
| 11-15 Years | [   ] Weeks |
| 16-20 Years | [   ] Weeks |
| 20 + Years | [   ] Weeks |

| TENURE | CLASS B MAXIMUM INDIVIDUAL BENEFIT |
|---|---|
| 3 - 5 Years | [   ] Weeks |
| 6 - 10 Years | [   ] Weeks |
| 11-15 Years | [   ] Weeks |
| 16-20 Years | [   ] Weeks |
| 20 + Years | [   ] Weeks |

| TENURE | CLASS C MAXIMUM INDIVIDUAL BENEFIT |
|---|---|
| 3 - 5 Years | [   ] Weeks |
| 6 - 10 Years | [   ] Weeks |
| 11-15 Years | [   ] Weeks |
| 16-20 Years | [   ] Weeks |
| 20 + Years | [   ] Weeks |

| TENURE | CLASS D MAXIMUM INDIVIDUAL BENEFIT |
|---|---|
| 3 - 5 Years | [   ] Weeks |
| 6 - 10 Years | [   ] Weeks |
| 11-15 Years | [   ] Weeks |
| 16-20 Years | [   ] Weeks |
| 20 + Years | [   ] Weeks |

FIGURE 8E

| TENURE | CLASS E MAXIMUM INDIVIDUAL BENEFIT | |
|---|---|---|
| 3 - 5 Years | [ ] | Weeks |
| 6 - 10 Years | [ ] | Weeks |
| 11-15 Years | [ ] | Weeks |
| 16-20 Years | [ ] | Weeks |
| 20 + Years | [ ] | Weeks |

| TENURE | CLASS F MAXIMUM INDIVIDUAL BENEFIT | |
|---|---|---|
| 3 - 5 Years | [ ] | Weeks |
| 6 - 10 Years | [ ] | Weeks |
| 11-15 Years | [ ] | Weeks |
| 16-20 Years | [ ] | Weeks |
| 20 + Years | [ ] | Weeks | d. The maximum amount we will pay on behalf of the Insured to Eligible Persons, the ("Aggregate Policy Limit"), is limited by category of coverage as described in the Schedule of Limits of Insurance.

1. We will pay all Termination Benefits in excess of the ("Deductible"), where applicable, per ("Policy Year") not to exceed the Aggregate Policy Limit.
    2. The Deductible, when applicable, will be first subtracted from the total amounts otherwise payable under ("Enhanced Coverage") as Termination Benefits to Eligible Persons and will apply for each policy year.
    3. Any payment by us on behalf of the Insured to an Eligible Person will reduce the Aggregate Policy Limit available for future payment, and there will be no reinstatement of the Aggregate Policy Limit.

SCHEDULE OF LIMITS OF INSURANCE*

| POLICY YEAR | BASIC DISPLACEMENT PLAN | ENHANCED DISPLACEMENT PLAN |
|---|---|---|
| 1 | [$ ] | [$ ] |
| 2 | [$ ] | [$ ] |
| 3 | [$ ] | [$ ] |
| 4 | [$ ] | [$ ] |
| 5 | [$ ] | [$ ] |

*Subject to adjustment based on prior years' experience

FIGURE 8F e. No other obligation or liability to pay sums in excess of the limits as set forth in the Schedule of Limits of Insurance is covered.

f. A claim by the Insured on behalf of the Eligible Person will be deemed to have been made upon the receipt by us or our designated representative of written notice by the Insured.

1. Such notice must be made by the Insured within 72 hours of the actual displacement of the Eligible Person or an action or actions taken by the Insured which likely will lead to a claim on behalf of an Eligible Person.

SECTION II - EXCLUSIONS

This insurance does not apply to:

1. Termination of employment arising from any of the following events, occurrences or conditions and shall disqualify an Eligible Person for payment of Termination Benefits:

a. Discharge for ("Cause") or willful misconduct including violation of employer's established policy, forbidden act, neglect of duty or criminal misconduct (unlawful behavior as determined by local, state or federal law)

b. The Eligible Person or any other person (whether fellow employee or not) participating in a job action, strike or lockout c. Illness, injury, pregnancy, childbirth or disability of the Eligible Person d. Termination known to be impending at the time of this insurance attaching to include contract specific employment e. Seasonal reduction in workforce f. Retirement or other voluntary separation g. Physical destruction (to any degree) of any property, real or personal, of anyone, whether Insured or not rendering the property unsuitable for conduct of the Insured's business h. Barring of entry to the property, real or personal, of anyone, whether an Eligible Person or not (directly or indirectly), by action of any person, group, organization or governmental body I. Acts of War including declared or undeclared, civil war, insurrection, rebellion, revolution by forces de jure or de facto j. Ordinance or law or any governmental action, directly or indirectly k. [*Merger or Acquisition*]

l. Bankruptcy

SECTION III - CONDITIONS

1. We will not pay any Termination Benefits:

a. during the first [*thirty (30) days*] of the policy period

FIGURE 8G b. to an otherwise Eligible Person who at the time of termination or at any time in the twelve (12) months preceding termination:
    1. was a majority stockholder of the Insured, or
    2. was an hourly wage earner of the Insured, or
    3. who was non-exempt for FICA, or
    4. who was regularly employed by the Insured less than thirty-five (35) hours per week, or
    5. was employed by the Insured for less than [*36 months*], or
    6. has been an Eligible Person for less than [*30 days*]

2. We will not pay Termination Benefits to any Eligible Person who:
    a. is ("Re-hired") within [*twelve (12) months*] of termination, and should such benefit have been paid, the Insured shall refund all such indemnity immediately upon rehiring.
    b. is engaged as an independent contractor by any Insured within [*twelve (12) months*] of termination.
    c.. has willfully concealed or misrepresented any material fact or circumstance or has committed or attempted to commit fraud or false swearing concerning this insurance or its subject matter, whether before or after a termination has occurred or compensation has been paid.
    d. has not registered with a post employment support services provider approved by us and reported to them bi-weekly.
    e. who does not remain an Eligible Person for the full duration of any ("Pay Period").
    f. who has an undischarged filing for bankruptcy under the United States Bankruptcy Code at the time of termination/claim.

3. Duties After Displacement/ ("Initial Requirements")
    <u>Insured must</u>:
    a. Give notice to us or our agent within 72 hours of Eligible Person displacement or notice of displacement, whichever occurs first.
    b. Cause all required data on the Eligible Person to be transmitted to us or our agent within 72 hours of employee displacement or notice of displacement, whichever occurs first.
    c. Provide relevant information to Spincor relating to the transitioning of existing pre-displacement employee benefits
    <u>Eligible Person must</u>:
    a. Contact Spincor within 72 hours of displacement
    b. Comply with all terms and conditions set forth by an approved provider of post employment support services

4. Payment of Claim/Loss Settlement
    a. We will pay all claims bi-weekly in arrears, beginning [*30 days*] after displacement of the Eligible Person, if Insured and Eligible Person have satisfactorily completed all of the Initial Requirements
    b. All ("Payments") will be made directly to the Eligible Person either through direct deposit or mailed to the address for the Eligible Person as disclosed in the ("Notice of

FIGURE 8H

Displacement").
- c. Payments will continue until the earlier to occur of:
    1. Re-employment of the Eligible Person
    2. Exhaustion of the Available Coverage
    3. Attainment of the Maximum Individual Benefit
    4. Death of the Eligible Person
- d. Payments will resume if:
    1. If, after [*60 days*] and at the sole discretion of the Eligible Person, the Eligible Person's ("New Employment") is deemed unsatisfactory and the eligible person resigns such position. Such period of time of employment will be debited against Eligible Person's Termination Benefits.
    2. Payments will continuein conformity with 4(c).
- e. Payments will not résumé if:
    1. Eligible Person is displaced for any reason by the ("New Employer").

5. Severability
  a. This insurance applies separately to each Eligible Person. This condition will not increase the Maximum Individual Benefit on any individual Eligible Person

6. Policy Period
  a. This policy applies only to an ("Occurrence of Displacement") which takes place during the policy period

7. Concealment or Fraud
  a. The entire policy will be void and all ("Current Benefits") terminated, if the Insured has:
    1. Intentionally concealed or misrepresented any material fact or circumstance
    2. Engaged in fraudulent conduct
    3. Made false statements
  b. Benefits payable to an otherwise Eligible Person who does not notify us within 24 hours of obtaining new employment will be liable for all benefits paid to him/her, whether consistent with the conditions of this policy, or not.

8. Liberalization Clause
  a. If we make a change which broadens coverage under this edition of our policy without additional premium charge, that change will automatically apply to your policy without additional premium charge, and that change will automatically apply to your insurance if the implementation of the change in your state occurs at least 60 days prior to the expiration of the policy as stated in the Declarations.
  b. This Liberalization Clause does not apply to changes implemented through introduction of a subsequent edition of our policy

9. Waiver or Change of Policy Provisions

FIGURE 8I a. A waiver or change of a provision of this policy must be in writing by us to be valid. Our request for an audit or examination of the books and records of the Insured will not waive any of our rights.

10. Cancellation a. You, the Insured, may cancel this policy at any time by notifying us in writing of the date the cancellation is to take effect b. We may cancel this policy only for the reasons stated below by notifying you in writing of the effective date of the cancellation. This cancellation notice may be delivered to you, or mailed to you at the mailing address shown in the Declarations. Proof of mailing will be sufficient proof of notice.

>(1.) When you have not paid the premium, we may cancel at any time by notifying you at least ten days before the date cancellation takes effect
>(2.) When this policy has been in effect for less than 60 days and is not a renewal with us, we may cancel for any reason by notifying you at least ten days before the date cancellation takes effect
>(3.) When this policy has been in effect for 60 days or more, or at any time if it is a renewal with us, we may cancel:
>>(a) if there has been a material misrepresentation of fact which if known to us would have caused us not to issue the policy, or
>>(b) if the risk has changed substantially since the policy was issued
>
>This can be done by notifying you at least 30 days before the date cancellation takes effect.
>(4.) When this policy is written for a period of more than one year, we may cancel for any reason at anniversary by notifying you at least 30 days before the date cancellation takes effect c. If the return premium is not refunded with the notice of cancellation or when this policy is returned to us, we will refund it within a reasonable time after the date cancellation takes effect

11. Nonrenewal a. We may elect not to renew this policy. We may do so by delivering to you, or mailing to you at the mailing address shown in the Declarations, written notice at least 30 days before the expiration date of this policy. Proof of mailing will be sufficient proof of notice.

12. Assignment a. Assignment of this policy will not be valid unless our written consent is requested and given

FIGURE 8J

SECTION IV. WHO IS AN INSURED a. The Insured is the person, persons, entity or entities named as Insured in the Declarations, and shall not include any Affiliate, as defined in the Definitions, Section (V), unless such Affiliate is named in the Declarations as an Insured.

SECTION V. DEFINITIONS

AFFILIATE: Any person or persons, entity or entities of which at least ten percent is owned by the Insured or any person or persons, entity or entities which own(s) at least ten percent of the Insured.

AGGREGATE POLICY LIMIT: The maximum dollar benefit payable by the Company on behalf of the Insured to Eligible Persons. Such amount is determined by adding the products of the stop loss percentage, as elected by the Insured and accepted by the Company, and the average salary of each Tenure Category in each Class.

AVAILABLE COVERAGE: The salary continuation and post employment support service benefit available to Eligible Person(s).

BASIC COVERAGE: Provided by the policy and covering displacement experience up to the weighted average and running prior five year historical displacement rate.

BENEFIT SCORING SYSTEM: A formula utilizing job description, tenure and salary range data to determine the allocable benefit to a displaced worker.

CAUSE: Willful misconduct including violation of the employer's established policy, forbidden act, neglect of duty or criminal misconduct (unlawful behavior as determined by local, state or federal law)

CLASS: A category of worker determined by job description, further defined according to salary range and tenure.

COMPANY: Insurance Company

FIGURE 8K

COMPUTATION OF PREMIUMS: The calculation of premium as done by the Company, reflecting Insured's election of stop loss, deductible and benefit level.

CURRENT BENEFITS: Any cash or service benefits paid, provided or available at any given point during the policy term.

DEDUCTIBLE: An amount paid by the Insured after the exhaustion of the Basic Coverage and measured as the product of a percentage elected by the Insured and the difference between the historical displacement rate (basic coverage) and the stop loss percentage. Such amount is paid by the Insured prior to payment by the Company of the Enhanced Benefit.

DUE DATE: The date upon which payment of the [*annual*] premium is due, further defined as the policy activation date or any anniversary thereof.

ELIGIBLE PERSON(S): A full time non-excluded employee of the Insured who has a minimum of [*three*] years of job tenure with the Insured.

ENHANCED COVERAGE: Coverage which exceeds Basic Coverage up through the Insured-elected and Company-approved stop loss.

HISTORICAL DISPLACEMENT RATE: The weighted average displacement rate calculated over a prior five year period.

INITIAL REQUIREMENTS: The steps that must be taken by both the Insured and Eligible Person(s) in order to activate the Termination Benefits to include, but not be limited to: (i) Insured notifying the Company within 24 hours of an employee displacement or notice of displacement, (ii) Insured transmitting all relevant data on displaced employee to the Company,
(iii) Eligible Person contacting the Company within 72 hours of displacement or notice of displacement.

INSURED: The person, persons, entity or entities named as the Insured in the Declarations, and shall not include any Affiliate unless such Affiliate is named in the Declarations as an Insured.

MAXIMUM INDIVIDUAL BENEFIT: The total number of weeks of salary continuation and

FIGURE 8L post employment support services available to a displaced worker as determined by the Benefit Scoring System.

NEW EMPLOYMENT: Post displacement re-hiring whether as the result of the Company's post employment support services or not.

NON-CAUSAL REASON: The grounds upon which an employer unilaterally elects to displace a worker. Such grounds are not consistent with those acts defined as "Cause".

NOTICE OF DISPLACEMENT: The contact made by the Insurer to the Company pursuant to the Initial Requirements notifying the Company of the displacement or intended displacement of a worker

OCCURRENCE OF DISPLACEMENT: The actual date of separation of a worker from employment with the Insured.

PAYMENTS: The cash benefit received by Eligible Person(s) no less frequently than once each month, in arrears.

PAY PERIOD: Either bi-weekly or monthly, as elected by the Insured.

POLICY YEAR: The period of time as measured from: (i) the commencement date of the policy to its first anniversary or (ii) the period of time beween anniversary dates.

RE-HIRED: The contractual or at will employment or the engaging as an independent contractor of a previously displaced employee within twelve months of that employee's displacement

TERMINATE: To permanently end any employer/employee relationship between the Insured and a worker.

TERMINATION BENEFITS: Salary continuation payments to be paid over a predetermined period of time which are calculated by deducting from a displaced worker's gross wages available

FIGURE 8M unemployment insurance benefits, whether applied for and received or not, and further reduced by the product of the worker's marginal rate and the fair market value of the post employment support services provided to the worker.

VI. GENERAL PROVISIONS

1. ENTIRE CONTRACT: This policy, the application of the Insured and the information worksheets attached thereto constitute the entire contract between the parties, and any statement made by the Insured shall be deemed a representation and not a warranty. No change in this policy shall be valid unless approved by an executive officer of the Company and unless such approval be endorsed hereon or attached hereto. No agent has authority to change this policy or to waive any of its provisions.

2. BENEFIT CHANGES: The Company or the Insured may change the amount of insurance for Eligible Persons or the Aggregate Policy Limit after this policy has been in effect for at least twelve months. Either party must advise the other in writing at least 30 days prior to the policy anniversary date of such requested change(s). The Company has the right to change the premiums charged based on the changes requested.

3. CLERICAL ERRORS: The Company will not deny or cancel coverage on an Eligible Person because of clerical error by the Insured or by the Company. After an error is found, the Company will take appropriate action to make the necessary corrections. This may include adjusting, collecting or refunding premium.

4. CONTESTING THIS POLICY: The Company relies on statements made by the Insured in the application. If there is no fraud, the Insured's statements:
   a. are considered representations and not warranties, and
   b. will not be used to void the policy or reduce any claim, and
   c. the Company will not contest the policy, after it has been in effect for two years.

5. ASSIGNMENT: An assignment of interest of this policy shall not bind the Company without its written consent.

6. LEGAL ACTIONS: No action at law or in equity shall be brought prior to the expiration of 60 days after written proof of right to compensation has been furnished in accordance with the requirements of this policy.

7. EXAMINATION AND AUDIT: The Company or its representatives shall be permitted to examine the Insured's records relating to this policy at any time during the policy term and within three years after the expiration of the policy, or until final adjustment and settlement of all claims

FIGURE 8N hereunder, whichever is later.

8. CONTROLLING LAW: Any part of this policy that conflicts with the state law where the policy is issued is understood to have been changed to meet the minimum requirements of the law in that state.

9. COMMENCEMENT OF COVERAGE: Coverage will become effective for an Eligible Person on the effective date of this policy, subject to the waiting period and other eligibility provisions of the policy, and in consideration of payment of the premium due.

10. EXPIRATION OF COVERAGE: Coverage will Terminate for an Insured on the earlier to occur of the date the policy Terminates or the date the Aggregate Policy Limit is reached.

11. PAYMENT OF PREMIUMS: The premiums due on or after the date of issue of this policy for the insurance provided hereunder shall be determined and shall be payable in accordance with the ("Due Date") and ("Computation of Premiums"). All premiums falling due under this policy, including adjustments thereof, if any, are payable by the Insured on or before their respective due dates, directly to the Company.

12. GRACE PERIOD: There is a 30 day grace period after the premium due date in which to pay the required premium. The policy will stay in force during the grace period.

FIGURE 89

SPINCOR LLC
APPLICATION

Date:_____

Applicant:  Company Name: _____
Address: _____
_____
_____

Contact: _____
Telephone: _____

Nature of Business: _____

E.I.N.: _____

Agent or Broker:  Name: _____
Address: _____
_____

Telephone: _____

Affiliates:  Company Name: _____
Address: _____
_____
_____

Contact: _____
Telephone: _____

Operating Locations:
_____
_____
_____

This information should be provided for each affiliate to be included in this application for coverage

FIGURE 8P

The following information should be prepared for each Affiliate by location and summarized on the Applicant Data Summary:

|  |  | Annual Payroll |
|---|---|---|
| Total # Current Employees: | _____ | $_____ |
| # Non-Qualifying: | _____ | $_____ |
| # Qualifying: | _____ | $_____ |

************************************

1. Complete the attached ("Historical Displacement Rate") exhibit by salary band for the *last 5 fiscal years* and attach it to this worksheet.

2. SPIN benefit request - provide detail by salary class and # of years of employment.. This should be prepared for each Class of Employee.

CLASS A

| Salary Level | % of Salary | # Years Employed | # Weeks Benefit |
|---|---|---|---|
|  |  |  |  |
| < $25,000 | 100 |  |  |
| $25,001 - $35k | 100 |  |  |
| $35,001 - $50k | 100 |  |  |
| $50,001 - $80k | 100 |  |  |
| $80,001 - $100k | 100 |  |  |
| > $100,000 | 100 |  |  |
|  |  |  |  |

CLASS B

| Salary Level | % of Salary | # Years Employed | # Weeks Benefit |
|---|---|---|---|
|  |  |  |  |
| > $35,000 | 100 |  |  |
| $35,001 - $50k | 100 |  |  |
| $50,001 - $80k | 100 |  |  |
| $80,001 - $100k | 100 |  |  |

FIGURE 8Q

| Salary Level | % of Salary | # Years Employed | # Weeks Benefit |
|---|---|---|---|
| $100,001 - $125k | 100 | | |
| > $125,000 | 100 | | |
| | | | |

CLASS C

| Salary Level | % of Salary | # Years Employed | # Weeks Benefit |
|---|---|---|---|
| | | | |
| < $35,000 | 100 | | |
| $35,001 - $50k | 100 | | |
| $50,001 - $80k | 100 | | |
| $80,001 - $100k | 100 | | |
| $100,001 - $125k | 100 | | |
| > $125,000 | 100 | | |
| | | | |

CLASS D

| Salary Level | % of Salary | # Years Employed | # Weeks Benefit |
|---|---|---|---|
| | | | |
| < $45,000 | 100 | | |
| $45,001 - $60k | 100 | | |
| $60,001 - $85k | 100 | | |
| $85,001 - $110k | 100 | | |
| $110,001 - $140k | 100 | | |
| > $140,000 | 100 | | |
| | | | |

FIGURE 8R

CLASS E

| Salary Level | % of Salary | # Years Employed | # Weeks Benefit |
|---|---|---|---|
|  |  |  |  |
| < $50,000 | 100 |  |  |
| $50,001 - $75k | 100 |  |  |
| $75,001 - $100k | 100 |  |  |
| $100,001 - $125k | 100 |  |  |
| $125,001 - $150k | 100 |  |  |
| > $150,000 | 100 |  |  |
|  |  |  |  |

CLASS F

| Salary Level | % of Salary | # Years Employed | # Weeks Benefit |
|---|---|---|---|
|  |  |  |  |
| < $60,000 | 100 |  |  |
| $60,001 - $85k | 100 |  |  |
| $85,001 - $120k | 100 |  |  |
| $120,001 - $140k | 100 |  |  |
| $140,001 - $175k | 100 |  |  |
| > $175,000 | 100 |  |  |
|  |  |  |  |

FIGURE 8S

3. What is your current State Unemployment Insurance Rate (SUI)?

4. Attach the last two years' audited financial statements.

5. Are you contemplating a major layoff, reorganization or acquisition in the next [five] years 6. Do you employ seasonal part-time or full-time workers? If yes, please provide details including the number of employees and total payroll for these workers.

7. Are any full-time employees covered by union contracts? If yes, please provide details including # of employees and total payroll for these workers.

8. Are any full-time employees contract specific? If yes, please provide details including the number of employees and total payroll for these workers.

FIGURE 8T

SPIN    HISTORICAL DISPLACEMENT DATA (Complete for prior five fiscal years for each Class of worker)

Applicant: _____
Company: _____
Division: _____
Location: _____

FISCAL YEAR 19__

| Salary Level | Total # Employees | Total # Displaced Employees | Average Month of Displacement | Total $ Severance Cost |
|---|---|---|---|---|
| $0 - $25k | | | | |
| $25k - $35k | | | | |
| $35k - $50k | | | | |
| $50k - $80k | | | | |
| $80k - $100k | | | | |
| $100k - $125k | | | | |
| $125k - $150k | | | | |
| $150k + | | | | |

FIGURE 8U

PROVIDING TERMINATION BENEFITS FOR EMPLOYEES

BACKGROUND OF THE INVENTION

This invention relates to providing termination benefits for employees who have been non-voluntarily terminated from employment.

One common way to control such benefits is through a private arrangement between an employer and each displaced employee, for example, a standard severance policy or a special termination package. Typical arrangements provide for a single payment on the date of termination. The amount of the termination payment is often based on the terminated employee's salary level and tenure. Outplacement services are sometimes offered.

Government sponsored unemployment insurance programs also typically pay benefits for a fixed number of weeks and usually are funded by premiums imposed on employers.

Private long-term disability insurance, funded by premiums, pays benefits when an employee is unable to work because of illness or injury.

An employee can also privately obtain coverage that continues payment of credit obligations for a brief period during unemployment.

Non-voluntary job changes are common. The causes include "downsizing", "rightsizing", mergers and acquisitions, product line changes, technology advances, degregation expanding global markets, and geographic redistribution of work force.

Although time between jobs tends to be limited for anyone who actively seeks a new job, it can be longer than is provided for in typical severance packages. The "fixed" monthly living costs incurred by moderate and high income employees, such as mortgage, credit card debt, tuition, car and insurance payments, tend to be large. An interruption in an employee's income stream after termination from one job and before the start of another one can cause disruption in life style and jeopardize his credit rating and therefore be a significant concern to him.

Many employers incur large costs for non-voluntary terminations of their employees. The annual costs of non-voluntary terminations may vary and in an occasional year be sharply higher than normal.

SUMMARY OF THE INVENTION

Among other things, the invention overcomes previous concerns about the risks associated with adverse selection by employers in connection with employment termination insurance products and makes such products feasible and profitable.

In general, in one aspect, the invention features a computer-based method for determining a price for an insurance product under which an insurer will provide termination benefits to employees who are non-voluntarily terminated from employment by an employer. Historical information is stored about rates of termination of employees of the employer who are non-voluntarily terminated during a predetermined historical period. Other historical information is stored indicative of periods of time during which employees who are non-voluntarily terminated are expected to remain unemployed. Based on the stored historical information, an amount of money is estimated that will be required to pay termination benefits under the insurance product to employees who are non-voluntarily terminated, assuming a continuation of the historical termination rates. A price is determined for the insurance product that is smaller than the estimated amount of money so that the employer's cost for termination benefits will be smaller under the insurance product than without the insurance product.

In implementations of the invention, the historical information about rates of termination includes numbers of terminated employees per year during the historical period, salary histories of the terminated employees, tenures of the terminated employees, and job classifications of terminated employees. The price for the insurance product is determined by considering different cells of employees separately, each cell including employees whose salary histories and tenures fall within predefined ranges. The price reflects expected periods of unemployment that are shorter than the historical periods of unemployment. The estimated amount of money that would be required to pay termination benefits is adjusted for expected inflation.

The insurance product includes a basic coverage that will provide termination benefits to no more employees than the average annual percentage of employees who were non-voluntarily terminated during the predetermined historical period, and the price determination reflects the basic coverage. The insurance product also includes an enhanced coverage that will provide termination benefits to employees who exceed the average annual percentage of employees who were non-voluntarily terminated during the predetermined historical period, and the price determination reflects the enhanced coverage. The enhanced coverage can be limited by a stop loss amount, and the price determination is based on the stop loss amount. Rights to the enhanced coverage are made available over time only in accordance with a vesting schedule.

In some implementations, the determination of price for the enhanced coverage yields a pricing formula based on numbers of terminations and the pricing formula is applied retroactively based on actual termination experience.

A limit of coverage is determined for each of the cells expressed as a maximum percentage of employees in that cell who will be eligible for basic termination benefits and if the stop loss approach is used for enhanced coverage, the vested percentage amount of the enhanced coverage for each cell, and a separate sub-price is set for each of the cells.

In general, in another aspect, the invention features a computer-based method for managing a durational risk associated with an insurance product. Information is stored about dates of termination and historical employment experiences of employees who have been terminated from employment by the employer and are covered by the insurance product. Information about displacement duration is also stored. Based on the stored information, information is generated that is useful in assisting terminated employees in finding new jobs within periods that will reduce the impact of durational risk. Dates of reemployment of terminated employees are tracked. Payments of termination benefits are controlled based on stored dates of termination.

In implementations of the invention, the payments are also controlled based on individual pay period benefit amounts and cumulative benefit amounts.

In general, in another aspect, the invention features a computer-based method of administering termination benefits. Information is stored that identifies separate time limits of termination benefits to be paid with respect to employees belonging to different risk cells. Information is also stored about claims made for termination benefits with respect to the employees belonging to different risk cells. The limits of termination benefits are compared with claims made for each of the risk cells, and benefits are withheld when the actual time for a risk cell exceeds the limit for the risk cell.

In implementations of the invention, information is stored about the periods of time that an employee must remain unemployed before termination benefits are paid. The time periods are compared with an actual time period during which an employee has remained unemployed. Benefits are withheld until the actual time period exceeds the stored time period.

Information may be received, stored, and searched about employees eligible for state unemployment insurance benefits. The eligible employees can be compared with employees who are terminated from employment by the employer. Benefits may be withheld when a terminated employee's eligibility status for state benefits matches a rule for withholding benefits.

In general, in another aspect, the invention features a computer-based method of administering basic and enhanced coverages of insurance products. The method includes calculating, storing, reporting and distributing broker commissions, claims administration fees, IP override, fronting fees, carrier overhead, and premium tax, and calculating and reporting required risk based capital.

In general, in another aspect, the invention features a computer-based method for use in reducing a durational risk associated with an insurance product. Information is stored that indicates receipt of notification of non-voluntary termination of an employee covered by the termination benefits. Information is also stored that can be assembled into prescripted interviews of terminated employees. In response to the stored information about notification of non-voluntary termination, a prescripted interview is provided to aid in accumulating information useful in placing the employee in a new job. The results of the interview are sorted and stored.

In general, in another aspect of the invention, the durational risk is reduced by storing information about the qualifications of a terminated employee for reemployment, storing information about available jobs, and matching the stored information. Retraining seminar may also be provided.

Among the advantages of the invention are one or more of the following. For the employer, the insurance preserves cash flow, may reduce termination costs, makes the costs more predictable, helps manage earnings, protects against potentially catastrophic expenses associated with reductions in force, reduces exposure to displaced employee litigation, maintains current year deductibility of premiums paid, and enhances the image of the employer as a good corporate citizen. To the covered terminated employee, the invention provides salary continuation for a specified period of time during unemployment and results-oriented job placement services. To the insurer, the invention provides a needed coverage to a substantial global market at a quantifiable risk and competitive price. Risk of adverse selection by employers is reduced both with respect to the employer's employee pool as a whole, and with respect to individual cells of employees. The manager of the delivery of benefits receives a fee for services and a possibility of additional profit if it successfully reduces the period of unemployment after the termination.

Other advantages and features will become apparent from the following description and from the claims.

BRIEF DESCRIPTION OF THE DRAWING

FIGS. 8A through 8U are pages of an insurance contract.

DESCRIPTION OF THE PREFERRED EMBODIMENTS

A concern of insurers (underwriters) with respect to any insurance product is so-called adverse selection. If buyers of the insurance can manipulate the nature or timing of events that trigger coverage under the insurance, the insurer runs an intolerable risk that buyers will take advantage of that possibility. Certain kinds of insurance have not been offered because of such adverse risk concerns.

Employment termination insurance, for example, has been viewed as carrying such an adverse selection risk if the premium is based on some calculated rate of terminations of all employees, e.g., an average historical termination experience for all employees of the employer.

Employers often plan and are in control of the nature and timing of major termination occurrences. They could buy such insurance with the intention of receiving coverage payments for a planned major termination event while paying a relatively small premium based on an assumed rate of terminations that reflects the employer's historical experience. Employers would also be able to plan in advance and control termination occurrences that are not extraordinary in terms of the number of people being terminated, but are extraordinary in terms of salaries.

The effect of adverse selection can be reduced enough to yield a viable insurance product by changing the way in which the risks are isolated, the premiums are calculated, and the benefits paid. One way to reduce the adverse selection risk is to divide the coverage into a base coverage and an enhanced coverage, and price the base and enhanced coverages in different ways. Segmenting the employees of an employer into cells by tenure, salary, and class also provides risk isolation. The coverage then is priced separately for each cell based on the historical termination experience for that cell. Coverage limits are applied to each cell separately.

Figure 1:
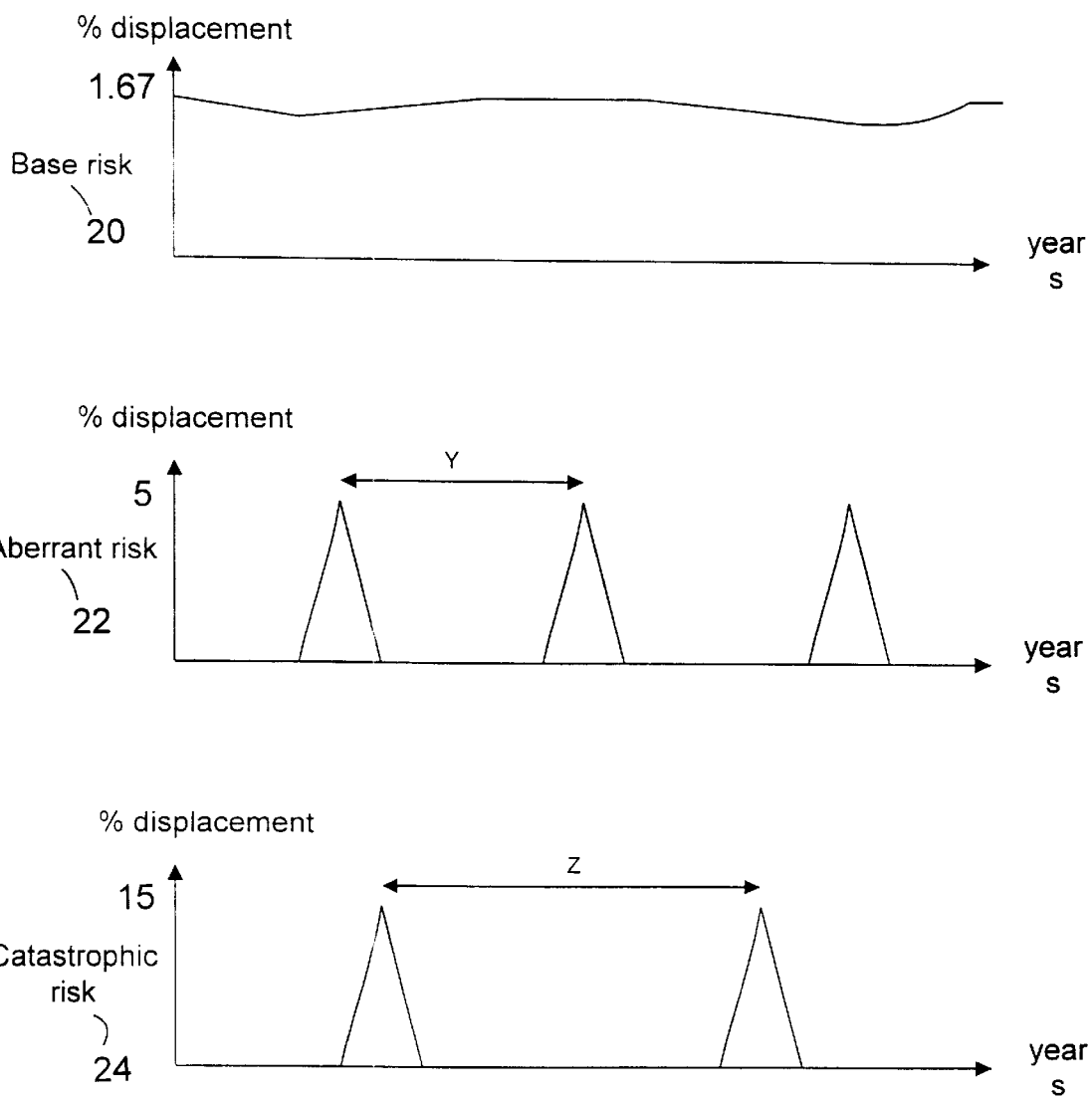
FIG. 1 illustrates an analysis of risk.

As seen in FIG. 1, historical non-voluntary termination information for a wide range of employers shows three categories of insurance risk. The same analysis also applies to the employee pool of an individual employer, and to employee cells within the employee pool of a given employer.

A base risk 20 is associated with normal non-voluntary terminations that occur continually in the ordinary course of business for any established/mature employer. This base risk varies little over many years and typically represents about 1.67% terminations per year. Because the variability is small, this risk can be accurately quantified as the average annual non-causal terminations experienced by the employer during an historical five-year period.

An aberrant risk 22 is associated with occasional short-lived "spikes" with moderately higher terminations than for the base risk. These could be associated, for example, with a termination scenario that involves a plant closing, a contract termination, a workforce consolidation, or a sale of an affiliate. The aberrant risks typically occur periodically with a period of Y years (e.g., Y=3, 4, or 5 years) and may involve, e.g., 2.5% to 5% terminations per year.

A catastrophic risk 24 may occur periodically with a period Z (e.g., Z=5, 7, or 10 years) that is longer than period Y. The termination rate could be as much as 10% to 15% per episode. Examples of catastrophic termination are a corporate restructuring, workforce realignment, or competitive or technological pressures. A catastrophic termination event caused by a Chapter 7 or Chapter 11 filing is an excluded event.

In a year in which an aberrant episode occurs, the 2.5% to 5% termination includes (is not in addition to) the normal 1.67% that would be expected for that year.

The base risk can be insured in a way that is largely insulated from adverse selection because its variability tends to be small and is inherent in the relationship between the employer and employee, especially given the pressures of technology, deregulation, and a global economic marketplace. Aberrant and catastrophic risks are subject to adverse selection because they are more highly variable and controllable by an employer.

A non-voluntary termination insurance policy for an employer may provide base coverage for the base risk and enhanced coverage for at least part of the aberrant and catastrophic risks. The premium that is charged for the coverage and the limits on the coverage are determined separately for each of the employee cells of the employer.

Figure 2:
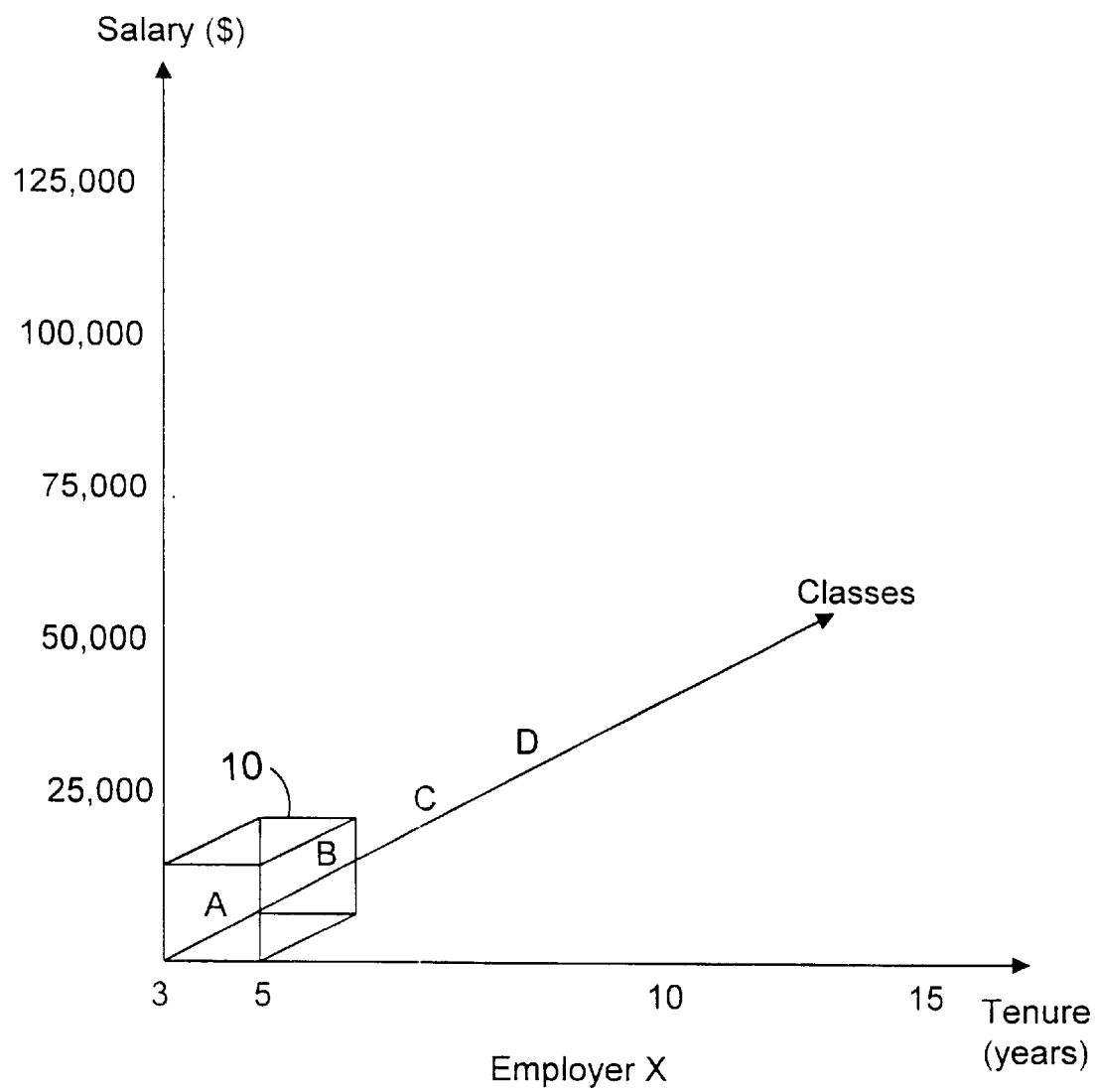
FIG. 2 illustrates employee cells.

As seen in FIG. 2, each employee cell 10 may be diagrammed (three dimensionally) based on the range of salaries, job classes (e.g., secretary, senior manager, labeled A, B, C, D), and range of tenure in years (e.g., 0–5 years) to which its members belong. (An employee must have three years of tenure to be vested and qualified for coverage.)

The coverages provided by the insurance are defined in the policy. Before the insurance contract is signed, the employer specifies the amount and duration of benefits to be paid to qualifying employees in each cell who are terminated unilaterally by the employer for non-causal reasons. For example, senior managers with 5 to 10 years of tenure and salaries between 50,000 and 75,000 may be given 26 weeks of termination benefits. The weekly termination benefit is set at a percentage (e.g., 100%) chosen by the employer at the time the insurance is bought.

The policy sets a maximum limit on the number of employees in each cell for whom base coverage will apply. The maximum is based on a moving five-year historical average base risk experience for terminations of that cell. For example, if the cell described above had an historical annual average termination rate of 1.67%, the policy would provide termination benefits for as many as, but no more than, 1.67% of the employees in that cell during the first year of the policy. At the end of the first year, and each subsequent year, the historical average percentage is recomputed rated on the previous five years (and in that sense in a running average). In determining the average, if any, of the previous five years has a rate that is more than 10% higher than the running average (e.g., 10% in one year when the running average is 1.67%) that percentage is reduced to 1.1 in the running average (1.1×1.67, in the example) and the running average is recomputed.

The policy also may set a maximum limit on the number of employees in each cell for whom (enhanced) coverage will apply. The maximum is based on a stop loss percentage selected by the employer, (e.g., 5% or 15%). The stop loss percentage is conceptually attributable to aberrant and catastrophic risks but is not necessarily the same as any historically determined percentage. If the chosen stop loss percentage is 5% in our example, the extended coverage of the policy would provide termination benefits for 3.33% (5% minus the 1.67% already covered by base coverage) of the employees in that cell each year.

However, in one implementation approach, the maximum termination benefits for extended coverage are not fully available in the first year of the policy. Rather they are phased in (vested) over several years. For example, in the first year, only 20% of the 3.33% would vest. So in the first year, the maximum benefit under extended coverage for the cell would be 0.66% of the number of employees in that cell. The reason for requiring vesting is to reduce the risk of adverse selection by preventing an employer from reaping the full coverage for a planned aberrant episode in, for example, the first year after buying the policy.

An alternative way to provide extended coverage while reducing the adverse selection risk is to price the extended coverage retroactively. In this approach, the employer is given the pricing formula before buying the policy. Full enhanced coverage begins immediately, but the employer is charged after the fact, at the agreed pricing, for years in which the termination experience exceeds the base coverage and falls within the extended coverage.

The premium to be paid by the employer for the insurance policy is determined by adding cell premium amounts determined for each category of coverage (base and extended) of the employee benefit cells of that employer. The premium amount for a cell is based on the benefit amounts and durations for that cell, the historical experience for that cell, a deductible amount and the stop loss percentage chosen by the employer, if applicable.

The premium amount for each category of coverage is a fraction of the termination expense that the employer would otherwise incur if terminations occurred at the historical rate (for base coverage) or at the stop loss rate (for extended coverage if applicable). The fraction is expressed in terms of the number of weeks of coverage for which the employer is charged in the premium compared with the stated number of weeks of benefit.

For example, if the historical base coverage experience is 1.67% and the termination benefits extend for 26 weeks, the premium could be set based on 18 weeks so that the employer pays 18/26 of 1.67% of the average salary of employees in that cell multiplied by the number of employees in the cell, for base coverage, net of unemployment insurance benefits received by the terminated employee.

A similar computation applies to the extended coverage with respect to the 3.33% (in the example discussed above) except that the numerator may be a higher number of weeks, say 20 weeks, to accommodate the fact that the duration of unemployment may be somewhat longer in aberrant or catastrophic termination scenarios than for the base risk.

By making the premium computation on a cell by cell basis, high salary cells will bear higher premium amounts for coverage that is limited as to those cells. This reduces the risk of adverse selection by an employer with respect to planned termination scenarios involving only high salary employees.

If the time it takes for an employee to become re-employed is the same as the benefits period (e.g., 26 weeks), the insurer would lose money because the premium only contemplates that benefits will last for a shorter period (e.g., 18 weeks). The result of the pricing approach is that the employer gets a reduction in his average annual termination expense. The insurer would undertake the risk (called a durational risk) that termination benefits will actually be greater than the premium. For example, assuming a 26 week benefit, the premium may only be based on 18 weeks. The insurer could also benefit from the upside of reemployment experience that is better than 18 weeks. The insurer, at its option, could choose to assume deceptional risks at different points in the 26 week period, for example, during the final two weeks.

However, in implementing the insurance product, the insurer may delegate both the downside risk and the upside potential implicit in the pricing strategy to a claims administrator. The insurer would pay the claims administrator exactly the number of months of benefit payments reflected in the premium amount (e.g., 18 weeks) for each terminated employee, regardless of the actual number of weeks of unemployment. The claims administrator would bear the obligation to pay the employee for some or all of the full coverage (e.g., until the employee is re-employed, up to 26 weeks) and would receive the profit and bear the loss of any difference between the actual amounts paid to the employee (until he is re-employed) and the premium-linked amounts received from the insurer.

An example of an insurance policy that provides such benefits is shown in FIGS 8A–8U.

Additional factors affect the coverage provisions of the policy and the pricing of the premium. The pricing model must take account of the tax rate on the premium, the fronting fee paid to the insurance entity, the expenses of administering claims, the fee to the claims administrator, overhead of the insuring entity including IP royalties, profit that is expected to be reaped on the premium by the insurer, costs of reinsurance, income from investments of funds, the government managed unemployment insurance benefits rates, the FICA and FUTA tax rates to the employer, the workmen's compensation premium rate of the employer, and the cost of outplacement services.

An employee who is placed in a new job and then either loses it or elects to leave will return to the coverage pool for the remaining benefit period or until he is re-employed, but the period during which he was not being paid by the claims administrator represents potential profit to the claims administrator.

The pricing can be done using a model created as a Microsoft Excel spreadsheet. An example of such a model that uses the inputs discussed above to generate a premium for the product was filed with the original patent application in the form of a CD-ROM and is available in the file of the United State Patent and Trademark Office. The file name is TEMPLATE.XLS and it can be run on Microsoft Excel 97, a copy of which is also being provided. Other kinds of software could be used to compute the insurance prices. The software could be run on any conventional personal computer or on any variety of other computer platforms. The software and all of the data needed for the pricing computations could be stored on a hard disk drive or other media.

Figure 3:
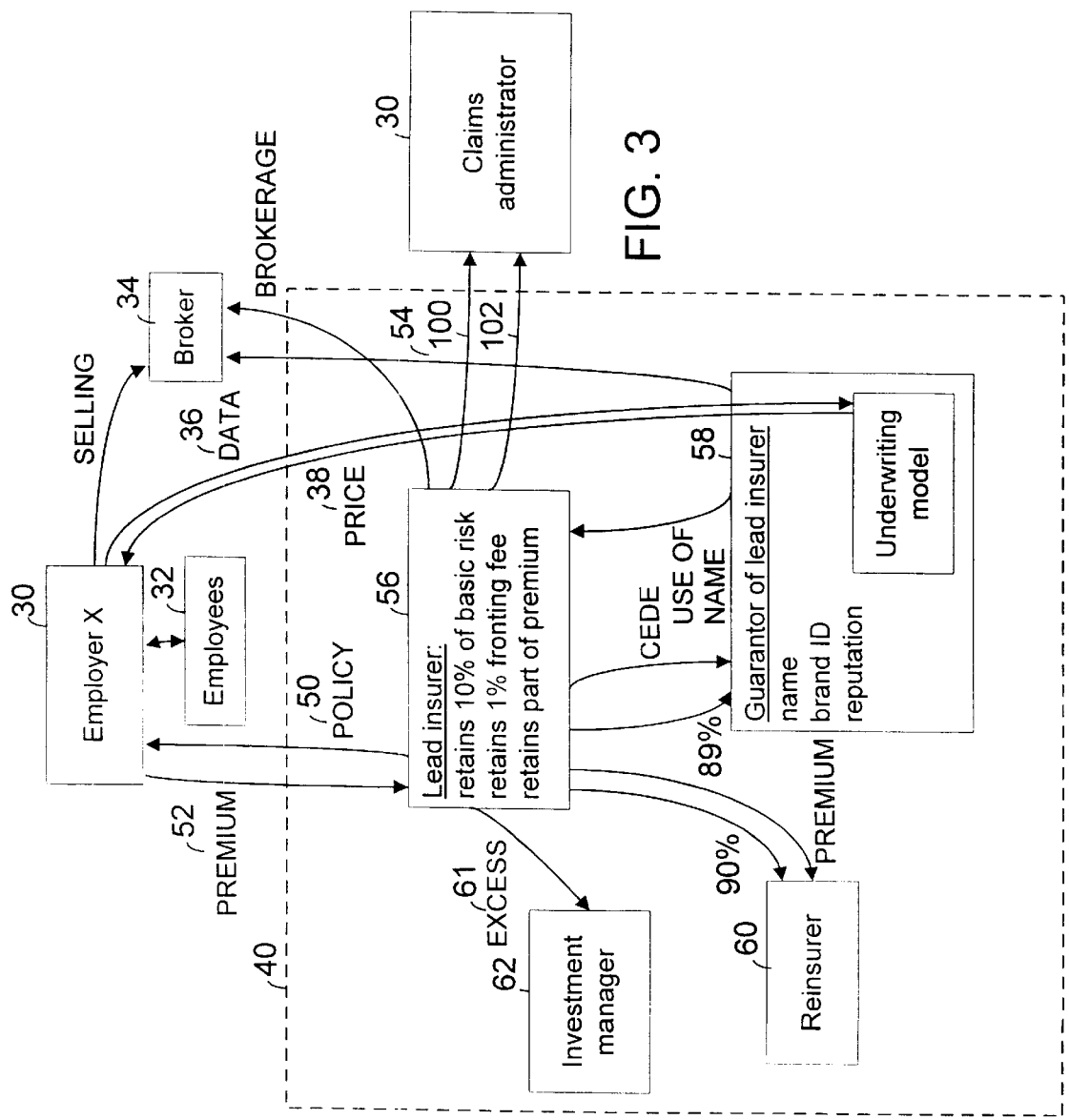
FIG. 3 is a block diagram of parties to and processes of underwriting.

As seen in FIG. 3, the insurance policy is sold by a broker 34 to an employer 30, which has qualified employees 32 who are covered by the termination benefits. Before the sale may be completed, the employer provides underwriting data 36 to an insuring entity 40 and the insuring entity 40 provides a price 38 (premium) to the employer. The underwriting data is loaded onto a storage medium in a computer controlled by the insuring entity and is used by the pricing model to generate the price. The insuring entity gives the broker authority 54 to use its name and make the sale on its behalf.

The insuring entity 40 provides a variety of services associated with the underwriting process. It does market research to identify prospects and does preliminary qualification of targets. It helps with preparing preliminary sales calls and with the initial presentation, including assistance with selection of variables and benefits. The insuring entity also gathers the historical data specific to the prospective customer. It develops the pricing and makes the underwriting decision. It helps with follow-up presentations including cost/service analyses. Once the underwriting decision is made, the insuring entity provides the policy and other documentation, activates the account, books claim liabilities, tracks amounts, frequency and duration of, and either directly or through the claims administrator pays claims, assists in providing retraining (when appropriate) and provides job search assistance, e.g., through a claims administrator.

The underwriting data includes historical termination information about each cell of employees. The data also includes choices made by the employer that affect the computation of the price. The choices may include the weeks of benefits (e.g., 26 weeks) that will be given to employees in each of the cells, the percentage of salary which will define the benefits, a deductible amount for enhanced coverage, and a stop loss percentage, if applicable.

The underwriting data is stored in computer readable form on a storage medium and used on a computer as part of the pricing model. The insuring entity uses the underwriting data to generate the price based on subprices generated for each of the employee cells separately.

Once the price has been set and the employer agrees to buy the policy, a contract 50 (FIGS. 8A to 8U) is provided by the insuring entity to the employer. In return, the employer pays an annual premium 52.

The insuring entity 40 can be structured in a wide variety of ways either within one company or by agreements among companies. In the example shown in FIG. 3, a lead insurer 56 issues the policy and receives the premium but then cedes portions of the risks and premiums to a guarantor 58 and to a reinsurer 60. Excesses 61 of premiums over benefits paid are invested by an investment manager 62. The insuring entity uses computer software to track the effectiveness of the investment manager.

The insurance policy provides base coverage and enhanced coverage (if the employer so chooses). The lead insurer retains the obligation to pay benefits on a percentage (e.g., 10%) of the base coverage, retains part of the premium as compensation for that risk, and receives a fronting fee of, say, 1% for its role in organizing the insurance entities.

The lead insurer cedes a percentage (e.g., 90%) of the base coverage risk and a percentage (e.g., 10%) of the enhanced risk obligation to the guarantor and pays, e.g., 89% of the base premium and 10% of the enhanced premium to the guarantor. The remaining 90% of the enhanced coverage risk is ceded to the reinsurer and 90% of the premium is paid to the reinsurer to compensate for its assumption of that risk.

The guarantor lends the use of its name (and implicitly its brand identification and reputation) to the lead insurer. The guarantor uses an underwriting model, described below, to develop the prices based on the historical termination data for an employer. The lead insurer licenses 100 a claims administrator 68 to manage the payment of benefits and the delivery of placement services. The claims administrator could be part of the insuring entity. If not, the lead insurer also pays the claims administrator an administrative fee 102.

Figure 4:
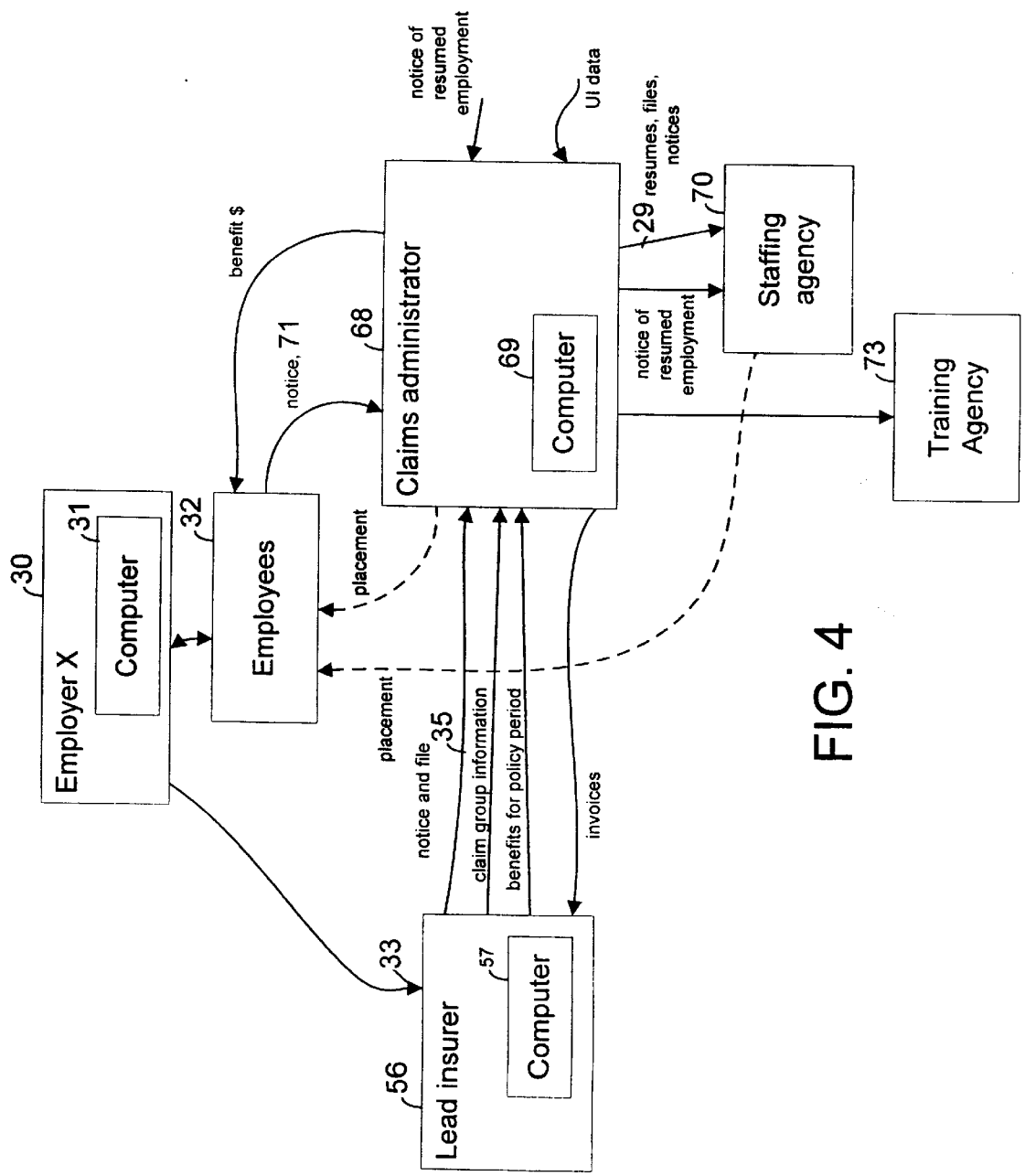
FIG. 4 is a block diagram of parties to and processes of claim administration.

As seen in FIG. 4, during the policy period, claims management and benefit payments are handled cooperatively by the claims administrator, the lead insurer 56, the employer 30, staffing agencies 70, and training provider, that have arrangements with the claims administrator.

When the employer 30 non-voluntarily terminates an employee 32, notice of displacement 33 and a copy of the appropriate employee file is sent from a computer 31 of the employer electronically to a computer 57 of the lead insurer. The information 35 is promptly forwarded electronically from the lead insurer's computer to a computer 69 of the claims administrator.

Each time a payment is made, an invoice is automatically generated and passed from the administrator's computer to the lead insurer's computer. Funds to cover the benefits are then returned electronically to the claims administrator. The reimbursement by the lead insurer of its percentage of the benefit obligations continues even after the employee returns to work. If that occurs earlier than the end of the benefit period, the subsequent reimbursement payments by the lead insurer are kept for the account of the claims administrator. This gives the administrator a strong incentive to get each terminated employee re-employed at the earliest possible time.

Payments and services to the employee continue automatically until either the benefit period defined for that employee's cell ends, or the employee finds another job if that occurs sooner. If so, notice of the new employment is given to the claims administrator's computer and is passed along electronically to the staffing agency computer as an instruction to cease work.

To obtain benefits, the employee must also promptly give a notice to activate service benefits 71 to the claims administrator 68. The notice to activate is matched in the computer 69 with the employee file that has already been received from the lead insurer, which initiates the steps required to provide the termination benefits. The computer 69 is arranged to provide resume information, employment files, and notices 79 automatically to approved staffing agencies 70, which contact the employees and provide placement and other services aimed at helping each employee to find a new job, reporting each client contact to the claim administrator. The claims administrator may also provide assistance in placement. The fees of the staffing agencies are paid by the claims administrator.

The responsibilities of the claims administrator include assigning an individual claim administrator to each terminated employee. The claim administrator has direct telephone contact with the terminated employee using a pre-scripted interview and develops a standard resume. A database search is done for possible matches with the employee's skills. Interviews may be scheduled. Training may be recommended and scheduled. Benefit payment authorizations are also reviewed and authorized.

Based on the day of termination, the employee cell to which the employee belongs, and the benefits to be provided (all of which are provided to computer 69 by the lead insurer), computer 69 automatically determines the dates and amounts of benefit payments to be made and mails checks or makes direct electronic deposits for the employee. The amounts of the payments are reduced by the amounts of state unemployment benefits whether applied for and received or not. Information 77 about those would have been initially loaded in computer 69 from as part of the original claim management software.

The main business strategy of the claims administrator is to reduce the period of unemployment (displacement duration) so that it can maximize, as its profit, the difference between the coverage payments received from the insuring entity and the benefit amounts paid to covered, terminated employees. To achieve this, the claims administrator maintains strategic relationships with specialty staffing service firms and specialty training companies, which provide temporary, contract, and permanent placement of professional and technical employees and place a high value on retraining.

Flow charts can be used to illustrate methods of the invention.

Figure 5:
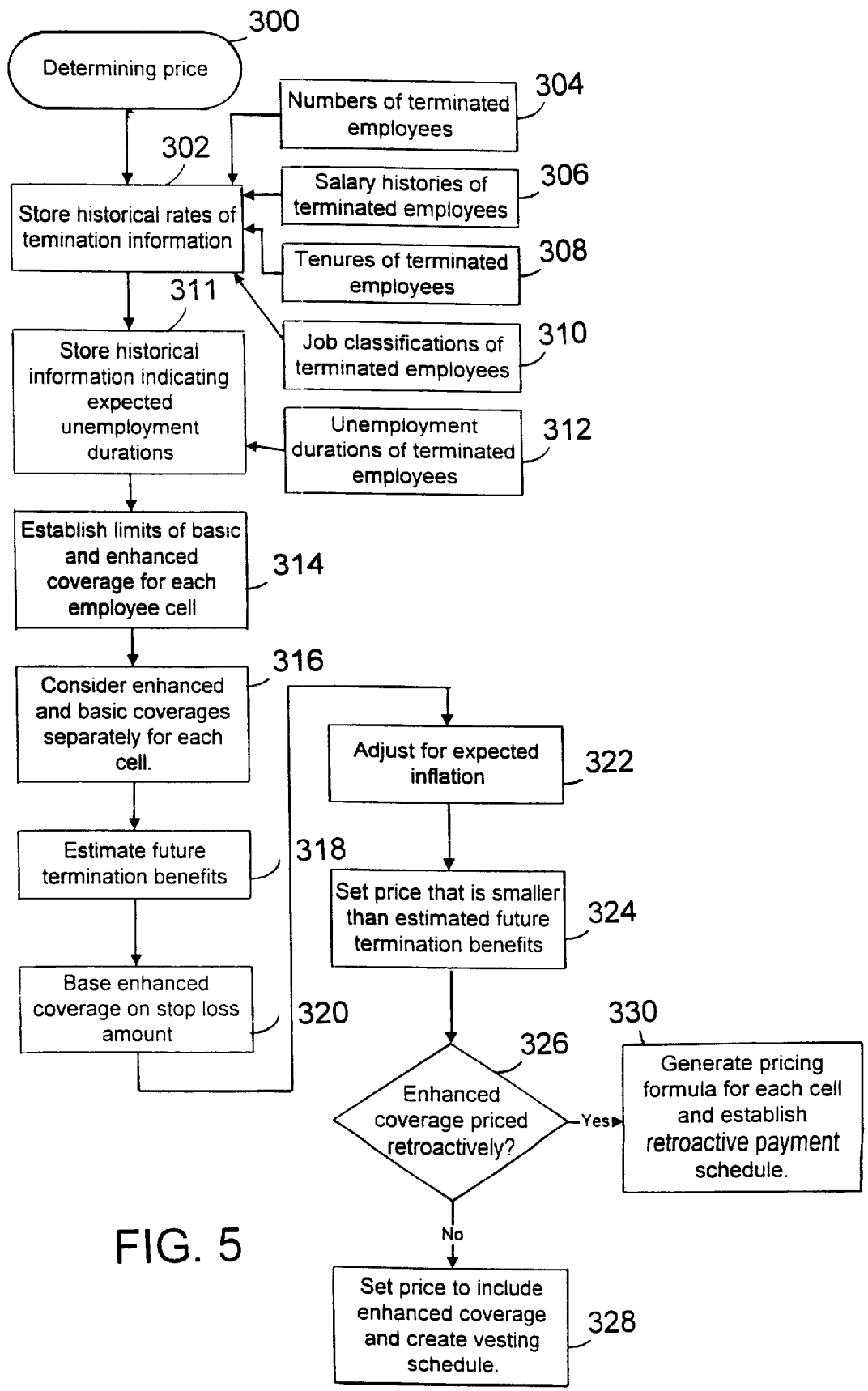
FIGS. 5, 6, and 7 are flow charts.
Figure 6:
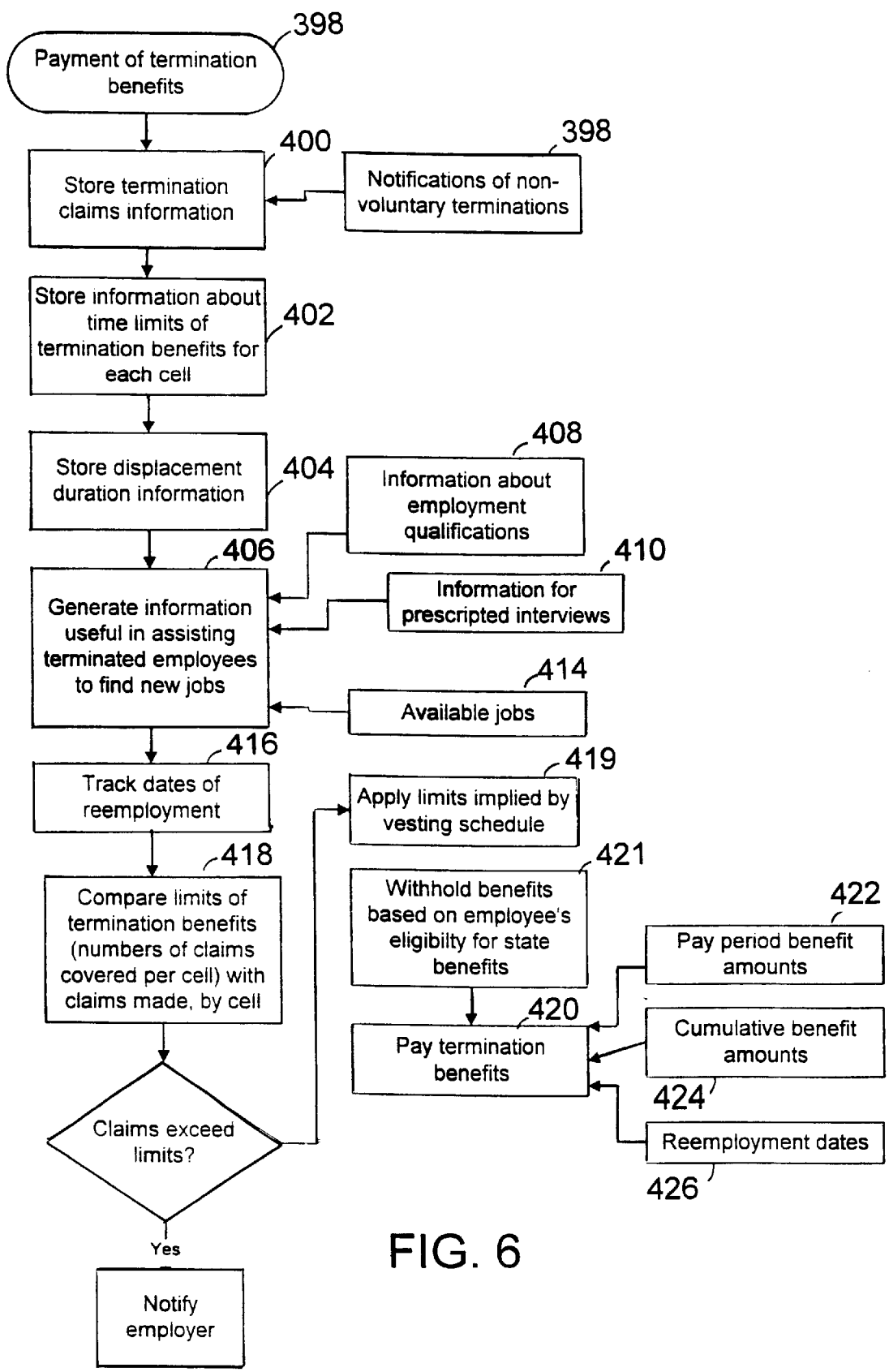

Referring to FIG. 5, determining a price 300 for a product includes the following sequence. Historical information is stored 302 about rates of termination of employees of the employer who are non-voluntarily terminated during a predetermined historical period. The information includes numbers of previously terminated and processed employees 304, salary histories 306, tenures 308, and job classifications 310. Historical information is also stored 311 indicating periods of time during which employees who are non-voluntarily terminated are expected to remain unemployed 311, including unemployment durations of terminated employees 312.

Limits of basic and enhanced coverage for each employee cell are established 314 using information provided by the insured.

The pricing process considers enhanced and basic coverages separately for each cell 316. An estimate is made 318 of the amount of money that will be required to pay termination benefits under the basic insurance product to employees who are non-voluntarily terminated, assuming a continuation of the historical termination rates.

The enhanced coverage can be based on the agreed stop loss amount 320. The price determined to this point for each cell is then adjusted for expected inflation 322. The price for the insurance product is set to be smaller than the estimated amount of money 324 so that the employer's cost for termination benefits will be smaller under the insurance product than without the insurance product.

If the enhanced coverage portion of the product is not to be priced retroactively 326, then a price is set and a vesting schedule is created 328. If the enhanced coverage portion of the product is to be priced retroactively, a pricing formula can be generated for each cell and a retroactive payment schedule can be set 330.

The process of payment of termination benefits 398 includes storing claims information 400 based on notifications of non-voluntary terminations; storing information about time limits of termination benefits for each cell 402, and storing displacement duration information 404. Information useful in assisting terminated employees to find new jobs is generated 406. This is done based on information about employment qualifications 408, information for pre-scripted interviews 410, and available jobs.414. Dates of reemployment are tracked 416. Limits of termination benefits are compared with claims made, by cell 418. Limits implied by any vesting schedule are applied to enhanced benefits 419. Benefits may be withheld based on the employee's eligibility for state benefits 421. Termination benefits are paid 420 based on individual pay period benefit amounts 422, cumulative benefit amounts 424, and reemployment dates 426.

Figure 7:
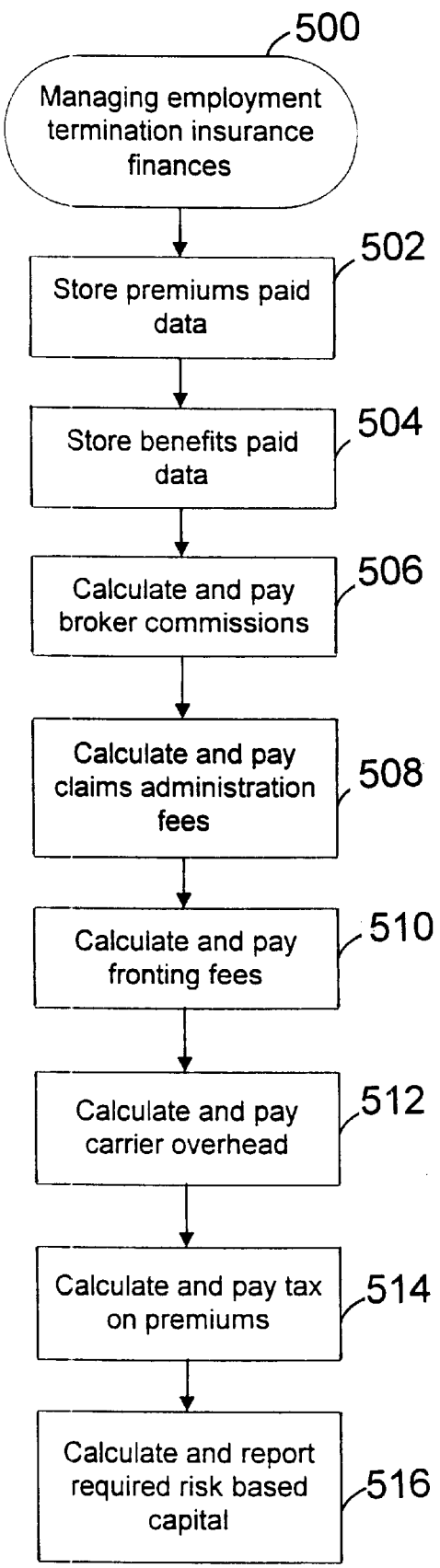

Referring to FIG. 7, the process for managing employment termination insurance finances 500 includes several steps. Data about premiums paid is stored 502 as is data about benefits paid 504. Broker commissions are calculated and paid 506 as are claims administration fees 508, fronting fees 510, carrier overhead 512, and taxes on premiums 514. Risk-based capital is also calculated and reported 516.

Other embodiments are within the scope of the following claims.

For example, the coverages could be split explicitly into three parts, instead of bundling them into two coverages. The three coverages could be basic, aberrant, and catastrophic.

What is claimed is:

1. A computer-based method for use in connection with an insurance product under which an insurer will provide termination benefits to employees of an employer who are non-voluntarily terminated from employment by the employer, the method comprising:

storing historical information about rates of termination of employees of the employer who are non-voluntarily terminated during a predetermined historical period, and historical information indicative of periods of time during which employees who are non-voluntarily terminated are expected to remain unemployed, based on the stored historical information, estimating an amount of money that will be required to pay termination benefits under the insurance product to employees who are non-voluntarily terminated, assuming a continuation of the historical termination rates, determining a price for the insurance product that is smaller than the estimated amount of money so that the employer's cost for termination benefits will be smaller under the insurance product than without the insurance product, and making the price available to a party for use in connection with offering the insurance product to the employer.

2. The method of claim 1 in which the historical information about rates of termination includes numbers of terminated employees per year during the historical period.

3. The method of claim 1 in which the historical information about rates of termination includes salary histories of the terminated employees.

4. The method of claim 1 in which the historical information about rates of termination includes tenures of the terminated employees.

5. The method of claim 1 in which the historical information includes job classifications of terminated employees.

6. The method of claim 1 in which the historical information includes the numbers, salary histories, and tenures of terminated employees and the price for the insurance product is determined by considering different cells of employees separately, each cell including employees whose job classifications, salary histories and tenures fall within predefined ranges.

7. The method of claim 1 in which the price reflects expected periods of unemployment that are shorter than the historical periods of unemployment.

8. The method of claim 1 in which the estimated amount of money is adjusted for expected inflation.

9. The method of claim 1 in which the insurance product includes a basic coverage that will provide termination benefits to no more employees than the average annual percentage of employees who were non-voluntarily terminated during the predetermined historical period, and the price determination reflects the basic coverage.

10. The method of claim 9 in which the average annual percentage is adjusted to reduce the impact of years in which the percentage of employees who were non-voluntarily terminated is aberrantly high.

11. The method of claim 1 in which the insurance product includes an enhanced coverage that will provide termination benefits to employees who exceed the average annual percentage of employees who were non-voluntarily terminated during the predetermined historical period, and the price determination reflects the enhanced coverage.

12. The method of claim 11 in which the enhanced coverage is limited by a stop loss amount, and the price determination is based on the stop loss amount.

13. The method of claim 12 in which rights to the enhanced coverage are made available over time only in accordance with a vesting schedule.

14. The method of claim 12 in which the determination of price for the enhanced coverage yields a pricing formula based on numbers of terminations and the pricing formula is applied retroactively based on actual termination experience.

15. The method of claim 1 further comprising storing information about employment demographics of employees of the employer sufficient to categorize the employees into risk cells, determining a limit of coverage for each of the cells expressed as a maximum percentage of employees in that cell who will be eligible for termination benefits, and setting a separate sub-price for each of the cells.

16. The method of claim 1 further comprising storing information about employment demographics of employees of the employer sufficient to categorize the employees into risk cells, and establishing a separate pricing formula for each of the cells to be applied retroactively at each anniversary date of the policy.

17. The method of claim 15 in which the employees are categorized based on salary, tenure, and job classification.

18. The method of claim 16 in which the employees are categorized based on salary, tenure, and job classification.

19. A computer-based method for use in connection with a component of price for a portion of coverage of an insurance product under which an insurer will provide termination benefits to employees of an employer who are non-voluntarily terminated from employment by the employer, the method comprising:

storing historical information about rates at which employees of the employer were non-voluntarily terminated in excess of an average rate of terminations during a predetermined historical period, storing a predetermined maximum number of employees in excess of the average historical rate of terminations who will be covered by the portion of the coverage for which the price component is being determined, determining the component of price based on the predetermined maximum number of employees, and making the component of price available to a party for use in connection with offering the insurance product to the employer.

20. The method of claim 19 in which the historical information about rates of termination includes numbers of terminated employees per year during the historical period.

21. The method of claim 19 in which the historical information about rates of termination includes salary histories of the terminated employees.

22. The method of claim 19 in which the historical information about rates of termination includes tenures of the terminated employees.

23. The method of claim 19 in which the historical information includes job classifications of terminated employees.

24. The method of claim 19 in which the historical information includes the numbers, salary histories, and tenures of terminated employees and the component price for the insurance product is determined by considering different cells of employees separately, each cell including employees whose job classifications, salary histories and tenures fall within predefined ranges.

25. The method of claim 19 further comprising storing historical information indicative of periods of time during which employees who are non-voluntarily terminated are expected to remain unemployed, the component price reflecting expected periods of unemployment that are shorter than the historical periods of unemployment.

26. The method of claim 19 in which the component of price is based on the stop loss amount.

27. The method of claim 19 further comprising:
storing information about employment demographics of employees of the employer sufficient to categorize the employees into risk cells,
determining a limit of coverage for each of the cells expressed as a maximum percentage of employees in that cell who will be eligible for termination benefits, and
setting a separate sub-price for each of the cells.

28. The method of claim 27 in which the employees are categorized based on salary, tenure, and job classification.

29. A computer-based method for use in connection with a component of price for a portion of coverage of an insurance product under which an insurer will provide termination benefits to employees of an employer who are non-voluntarily terminated from employment by the employer, the method comprising:
storing historical information about rates at which employees of the employer were non-voluntarily terminated in excess of the average rate of terminations during a predetermined historical period,
determining the component of price for the actual number of employees who are terminated in excess of the average rate of terminations during the predetermined historical period, and
making the component of price available to a party for use in connection with offering the insurance product to the employer.

30. The method of claim 29 in which the historical information about rates of termination includes numbers of terminated employees per year during the historical period.

31. The method of claim 29 in which the historical information about rates of termination includes salary histories of the terminated employees.

32. The method of claim 29 in which the historical information about rates of termination includes tenures of the terminated employees.

33. The method of claim 29 in which the historical information includes job classifications of terminated employees.

34. The method of claim 29 in which the historical information includes the numbers, salary histories, and tenures of terminated employees and the component price for the insurance product is determined by considering different cells of employees separately, each cell including employees whose job classifications, salary histories and tenures fall within predefined ranges.

35. The method of claim 29 in which:
the component price is used in connection with an insurance product having a basic coverage that will provide termination benefits to no more employees than the average annual percentage of employees who were non-voluntarily terminated during the predetermined historical period, and
a composite price is computed based on the component price and a basic price associated with the basic coverage.

36. The method of claim 29 in which:
the component price is used in connection with an insurance product having an enhanced coverage that will provide termination benefits to employees who exceed the average annual percentage of employees who were non-voluntarily terminated during the predetermined historical period, and
the component price determination reflects the enhanced coverage.

37. The method of claim 36 in which the enhanced coverage is limited by a stop loss amount, and the component of price is based on the stop loss amount.

38. The method of claim 37 in which the determination of price for the enhanced coverage yields a pricing formula based on numbers of terminations and the pricing formula is applied retroactively based on actual termination experience.

39. A computer-based method for use in connection with a price for coverage of an insurance product under which an insurer will provide termination benefits to employees of an employer who are non-voluntarily terminated from employment by the employer, the method comprising:
storing information about employment demographics of employees of the employer sufficient to categorize the employees into risk cells,
determining a limit for basic coverage for each of the cells expressed as a maximum percentage of the total number of employees in that cell who will be eligible for termination benefits,
setting a separate price for basic coverage for each of the cells,
determining a limit for enhanced coverage for each of the cells expressed as a maximum percentage of the total number of employees in that cell who will be eligible for termination benefits,
setting a separate price formula for enhanced coverage for each of the cells,
determining the price for enhanced coverage for each of the cells retroactively based on the actual number of employees who are terminated in excess of an average rate of terminations during a predetermined historical period, and
making the retroactively determined price available to a party for use in connection with charging the employer for the insurance product.

40. The method of claim 39 in which the information about employment demographics includes numbers of terminated employees per year during the historical period.

41. The method of claim 39 in which the information about employment demographics includes salary histories of the employees.

42. The method of claim 39 in which the information about employment demographics includes tenures of the employees.

43. The method of claim 39 in which the employment demographics includes job classifications of the employees.

44. The method of claim 39 further comprising storing historical information indicative of periods of time during which employees who are non-voluntarily terminated are expected to remain unemployed, the price reflecting expected periods of unemployment that are shorter than the historical periods of unemployment.

45. The method of claim 39 in which the determined price is adjusted for expected inflation.

46. The method of claim 45 in which the average annual percentage is adjusted to reduce the impact of years in which the percentage of employees who were non-voluntarily terminated is aberrantly high.

47. The method of claim 39 in which the price for enhanced coverage is limited by a stop loss amount.

48. The method of claim 39 in which the employees are categorized based on salary, tenure, and job classification.

49. A computer-based system for use in connection with a price for insurance that provides termination benefits to employees of an employer who are non-voluntarily terminated from employment by an employer, comprising:

storing information about historical termination experience for the employees, determining a base risk representing a component of the termination experience that has a relatively smaller variation over a period of years, setting a risk component of the price associated with covering the smaller variation base risk, setting a second component of the price associated with covering an enhanced risk with a predefined limit of coverage, the enhanced risk representing a component of the termination experience that has a relatively larger variation over a period of years, determining the price based on the first and second components, and making the price available to a party for use in connection with offering the insurance product to the employer.

50. The method of claim 49 in which the second component comprises a pricing formula, and the determining of the price is done retroactively by applying the formula to actual termination to determine the second component.

51. The method of claim 49 in which the information about termination experience includes the numbers of terminated employees per year during a historical period.

52. The system of claim 49 further comprising storing salary histories of the terminated employees.

53. The system of claim 49 in which the in formation about termination experience includes tenures of the terminated employees.

54. The system of claim 49 in which information about termination experience includes job classifications of terminated employees.

55. The system of claim 49 further comprising storing the numbers, salary histories, and tenures of terminated employees and the price for the insurance product is determined by considering different cells of employees separately, each cell including employees whose job classifications, salary histories and tenures fall within predefined ranges.

56. The system of claim 49 in which information about termination experience includes historical information indicative of periods of time during which employees who are non-voluntarily terminated are expected to remain unemployed, the price reflecting expected periods of unemployment that are shorter than the historical periods of unemployment.

57. The system of claim 49 in which the price is adjusted for expected inflation.

58. The system of claim 49 in which the second component is limited by a stop loss amount.

59. The system of claim 49 in which rights to enhanced coverage associated with the second component are made available over time only in accordance with a vesting schedule.

60. The system of claim 49 in which the determination of the second component price yields a pricing formula based on numbers of terminations and the pricing formula is applied retroactively based on actual termination experience.

61. The system of claim 49 further comprising:

storing information about employment demographics of employees of the employer sufficient to categorize the employees into risk cells, determining a limit of coverage for each of the cells expressed as a maximum percentage of employees in that cell who will be eligible for termination benefits, and setting a separate sub-price for each of the cells.

62. The system of claim 49 further comprising:

storing information about employment demographics of employees of the employer sufficient to categorize the employees into risk cells, and establishing a separate pricing formula for each of the cells to be applied retroactively at each anniversary date of a policy associated with the insurance.

63. The system of claim 61 in which the employees are categorized based on salary, tenure, and job classification.

64. The system of claim 62 in which the employees are categorized based on salary, tenure, and job classification.

* * * * *